US011786939B2

(12) United States Patent
Krismanic et al.

(10) Patent No.: US 11,786,939 B2
(45) Date of Patent: Oct. 17, 2023

(54) SCREENING ELEMENT FOR SCREENING AND TRANSPORTING GRIT MATERIAL, FOR APPLYING TO A SANDING DEVICE OF A SANDING APPARATUS FOR A VEHICLE, SANDING DEVICE COMPRISING A SCREENING ELEMENT, PRODUCTION METHOD, AND METHOD FOR OPERATING A SCREENING ELEMENT

(71) Applicant: KNORR-BREMSE GESELLSCHAFT MIT BESCHRÄNKTER HAFTUNG, Mödling (AT)

(72) Inventors: Georg Krismanic, Wein (AT); Andreas Lang, Wein (AT); Albert Missliwetz, Wein (AT)

(73) Assignee: KNORR-BREMSE GESELLSCHAFT MIT BESCHRÄNKTER, Haftung (DE)

( * ) Notice: Subject to any disclaimer, the term of this patent is extended or adjusted under 35 U.S.C. 154(b) by 577 days.

(21) Appl. No.: 16/960,820

(22) PCT Filed: Jan. 7, 2019

(86) PCT No.: PCT/EP2019/050205
§ 371 (c)(1),
(2) Date: Jul. 8, 2020

(87) PCT Pub. No.: WO2019/135986
PCT Pub. Date: Jul. 11, 2019

(65) Prior Publication Data
US 2020/0353508 A1  Nov. 12, 2020

(30) Foreign Application Priority Data
Jan. 8, 2018  (DE) .................. 10 2018 100 264.5

(51) Int. Cl.
*B07B 1/46* (2006.01)
*B24B 55/06* (2006.01)
(Continued)

(52) U.S. Cl.
CPC .............. *B07B 1/469* (2013.01); *B24B 55/06* (2013.01); *B60B 39/024* (2013.01);
(Continued)

(58) Field of Classification Search
CPC ....... B07B 1/469; B24B 55/06; B60B 39/024; B60B 39/06; B65G 53/4614; B65G 2201/045; B61C 15/10
(Continued)

(56) References Cited

U.S. PATENT DOCUMENTS 6,685,007 B1 * 2/2004 Gustavsson ........ B65G 53/4616
                                                   198/723
10,435,039 B2 * 10/2019 Krismanic ............. B60B 19/06

FOREIGN PATENT DOCUMENTS

AT         516793 A1 *  8/2016  ............. B60B 19/06
AT         516794 A1     8/2016
(Continued)

OTHER PUBLICATIONS

International Search Report and Written Opinion corresponding to PCT/EP2019/050205, dated Mar. 21, 2019.

*Primary Examiner* — Terrell H Matthews
(74) *Attorney, Agent, or Firm* — Barnes & Thornburg LLP

(57) ABSTRACT

The invention relates to a screening element for screening and transporting grit material, for applying to a sanding device of a sanding apparatus for a vehicle. The screening element includes a plate element provided with a shaft-coupling mechanism, at least one through-opening, and at least one lug. The shaft-coupling mechanism is designed to (Continued)

couple the screening element to a shaft device of a rotary feeder of the sanding device. The through-opening is arranged in the plate element and is designed to guide grit material through the plate element. The lug extends transversely in relation to a main surface of the plate element, away from the plate element.

17 Claims, 3 Drawing Sheets

(51) Int. Cl.
*B60B 39/02* (2006.01)
*B65G 53/46* (2006.01)
*B60B 39/06* (2006.01)
*B61C 15/10* (2006.01)

(52) U.S. Cl.
CPC .......... *B65G 53/4616* (2013.01); *B60B 39/06* (2013.01); *B61C 15/10* (2013.01); *B65G 2201/045* (2013.01)

(58) Field of Classification Search
USPC .......................................................... 209/397
See application file for complete search history.

(56) References Cited

FOREIGN PATENT DOCUMENTS

| DE | 1024481 B | | 2/1958 | |
| DE | 1024881 B | * | 2/1958 | |
| DE | 1024881 B | | 2/1958 | |
| DE | 2606483 A1 | | 8/1976 | |
| DE | 19501179 A1 | | 7/1996 | |
| DE | 19501179 A1 | * | 7/1996 | ............. B65D 88/68 |
| WO | 0075056 A1 | | 12/2000 | |
| WO | WO-0075056 A1 | * | 12/2000 | ......... B65G 53/4616 |
| WO | 2011127937 A1 | | 10/2011 | |
| WO | WO-2011127937 A1 | * | 10/2011 | ............. B65B 1/363 |
| WO | 20150058887 A1 | | 1/2015 | |
| WO | 2016118995 A1 | | 8/2016 | |
| WO | 2016118996 A1 | | 8/2016 | |
| WO | WO-2016118996 A1 | * | 8/2016 | ............. B60B 19/06 |

* cited by examiner

SCREENING ELEMENT FOR SCREENING AND TRANSPORTING GRIT MATERIAL, FOR APPLYING TO A SANDING DEVICE OF A SANDING APPARATUS FOR A VEHICLE, SANDING DEVICE COMPRISING A SCREENING ELEMENT, PRODUCTION METHOD, AND METHOD FOR OPERATING A SCREENING ELEMENT

CROSS REFERENCE AND PRIORITY CLAIM

This patent application is a U.S. National Phase of International Patent Application No. PCT/EP2019/050205 filed Jan. 7, 2019, which claims priority to German Patent Application No. 10 2018 100 264.5, the disclosure of which being incorporated herein by reference in their entireties.

FIELD

Disclosed embodiments relate to a screening element for screening and conveying grit material for receiving by a sanding device of a sanding apparatus for a vehicle, to a sanding device having a screening element, to a method for generating and a method for operating a screening element.

BACKGROUND

There are sanding apparatuses which have a rotary feeder with a vertical axis (also referred to as a horizontal rotary feeder) for metering grit material or bulk material. The grit material, prior to metering, makes its way from a sand hopper of the sanding apparatus to an infeed opening toward the rotary valve.

SUMMARY

Against this background, the disclosed embodiments achieve a screening element for screening and conveying grit material for receiving by a sanding device of a sanding apparatus for a vehicle, an improved sanding device having a screening element, a method for generating and a method for operating a screening element.

This is achieved by a screening element for screening and conveying grit material for receiving by a sanding device of a sanding apparatus for a vehicle, by a sanding device having a screening element, by a method for generating and by a method for operating a screening element, disclosed herein.

BRIEF DESCRIPTION OF THE FIGURES

Exemplary embodiments presented here will be explained in more detail in the description hereunder with reference to the figures in which.

DETAILED DESCRIPTION

Figure 1:
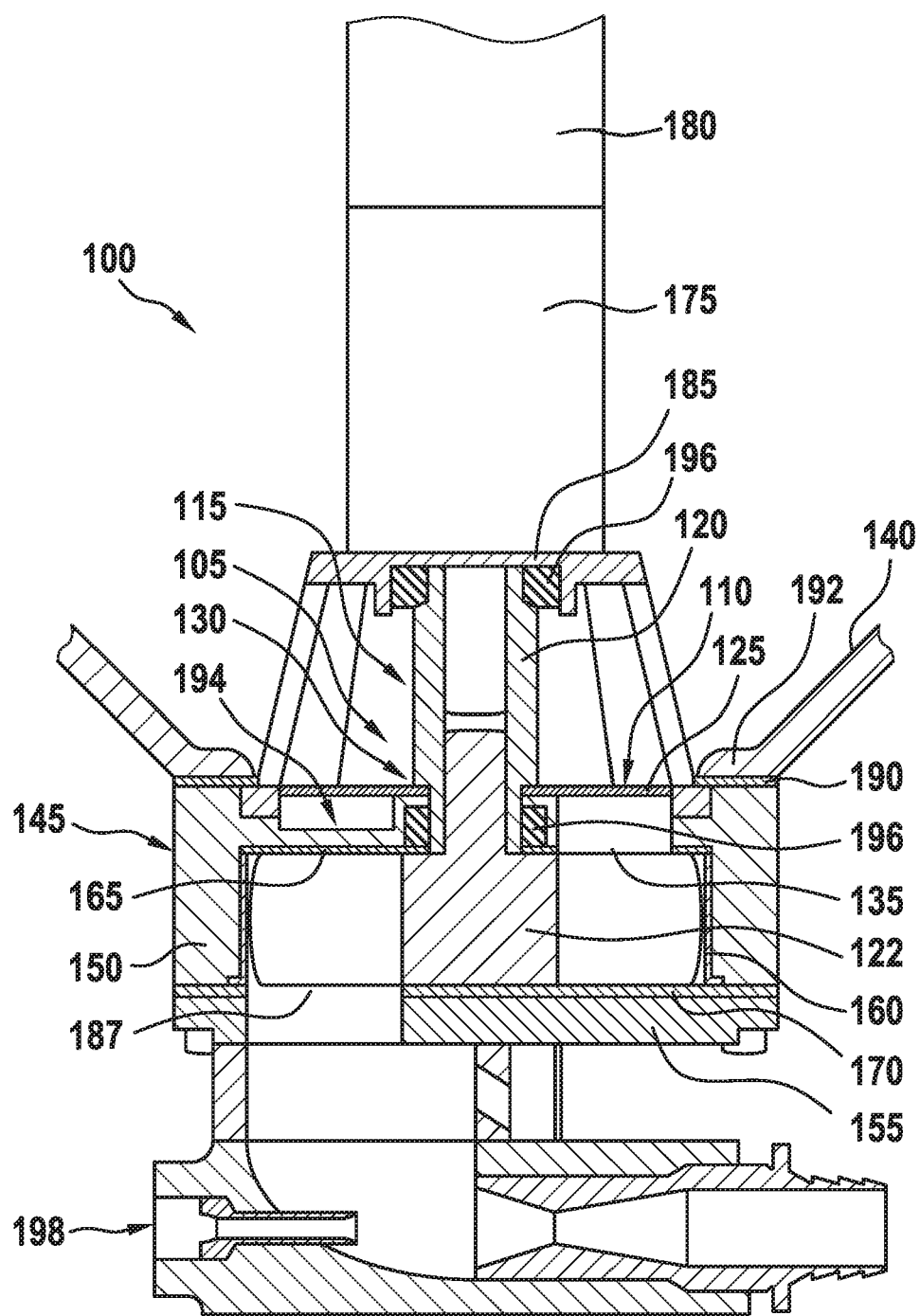
FIG. 1 shows a schematic cross-sectional illustration of a sanding apparatus having a sanding device having a screening element for screening and conveying grit material for a vehicle, according to one exemplary embodiment.

WO 11127937 A1 describes a sanding apparatus having a horizontal rotary feeder for metering bulk material. DE 19501179 A1 and DE 2606483 describe metering apparatuses with a vertical rotation axis for grit material. Agitator rods and agitator wings for rendering the sand so as to be free-flowing and for eliminating any dead volume are used in DE 19501179 A1. In DE 2606483 A1, the sand is generally fed by way of a dedicated filler tube.

Against this background, the disclosed embodiments achieve a screening element for screening and conveying grit material for receiving by a sanding device of a sanding apparatus for a vehicle, an improved sanding device having a screening element, a method for generating and a method for operating a screening element.

The technical advantages which can be achieved by the disclosed embodiments lie in the fact that a screening element presented here, when in operation in or on a sanding device, screens and also conveys grit material prior to the latter entering an infeed opening of a rotary valve of the sanding device. By way of the screen element presented here it can thus be prevented that foreign matter or lumps of sand make their way into the rotary valve, while guaranteeing uniform and thorough conveying of the sand to the infeed opening of the rotary valve. The screening element herein advantageously occupies only an extremely minor installation space.

A screening element for screening and conveying grit is configured for being received by a sanding device of a sanding apparatus for a vehicle. The screening element has a plate element having a shaft coupling installation, at least one passage opening, and at least one lug. The shaft coupling installation is configured for coupling the screening element to a shaft installation of a rotary valve of the sanding device. The passage opening is disposed in the plate element and is configured for passing grit material through the plate element. From the plate element the lug extends away transversely or at a defined angle to a main surface of the plate element.

The sanding device may be at least one element of a sanding apparatus, for example an element of a sand metering installation of the sanding apparatus. Such a sand metering installation for metering grit material such as sand can have a rotary valve, for example, which in turn can have a vertical rotation axis. For example, the sanding device can be or have a shaft installation of the sand metering installation, wherein the shaft installation for moving the rotary valve can be coupled or able to be coupled to the latter. The sanding device can also comprise the rotary valve.

The vehicle can be a rail vehicle.

The shaft coupling installation of the screening element is configured for rendering the screening element so as to be able to be coupled to a shaft housing of the shaft installation of the rotary valve, for example. A transmission of torque of the shaft installation to the screening element is thus advantageously enabled in a state coupled to the shaft installation, on account of which the screening element in the operation of the rotary valve also rotates on the shaft installation.

The screening element presented here can be disposed or able to be disposed between a sand hopper of the sanding apparatus and an infeed opening of the rotary valve. The passage opening thus advantageously enables screened grit material to pass from the sand hopper to the infeed opening. The passage opening can be designed so as to be an elongated circle.

When the screening installation is coupled to the shaft installation as described, the lug is advantageously disposed and configured for moving the grit material when the shaft installation is moving. For example, wet grit material can be broken down and/or loosened and/or shoveled in one direction by the lug.

The plate element can be configured as a sheet metal plate.

The screening element according to one embodiment can be designed so as to be circular.

The shaft coupling installation can be disposed in a center of the plate element, in particular wherein the shaft coupling installation can be configured as a shaft passage opening for guiding therethrough the shaft installation. For example, the shaft coupling installation can have a hexagonal opening and/or a polygonal opening and/or a feather key and/or a key way and/or a toothing. The shaft coupling installation can be welded, or adhesively bonded, jammed and/or press-fitted to the shaft housing in order to by means of the shaft installation render the screening element so as to be movable in the sanding apparatus.

The lug can extend from an internal peripheral side of the passage opening. The lug can be embodied so as to be rectangular or semicircular or triangular, or as a bolt. An angle of the lug can be inclined in relation to a center point so as to be able to shovel grit material in one direction when the screening element is moving.

According to at least one embodiment, the screening element can have at least one further lug which from the plate element extends away transversely or at a defined angle to the main surface, in particular wherein the further lug can extend from a further internal peripheral side of the passage opening that is disposed transversely to the internal peripheral side. Such a disposal of the lug and of the further lug can enable grit material to be effectively broken down and/or shoveled.

The screening element can also have at least one additional passage opening which is disposed in the plate element, and/or at least one additional lug which from the plate element can extend away transversely or at a defined angle to a main surface of the plate element that is opposite the main surface. Accordingly, when lugs from the plate element extend away to both main surfaces of the screening element, conveying of the grit material is thus enabled both prior to as well as after the screening. For example, the screening element can be disposed on the shaft installation in such a manner that the lug and the further lug extend in the direction of the sand hopper, and the additional lug extends in the direction of the infeed opening of the rotary valve. In the operation of the screening element, the additional lug in such a position can prevent already screened grit material from potentially accumulating or backing up below the screening element.

The plate element and the lug and/or the further lug and/or the additional lug can be configured so as to be integral, in particular wherein the passage opening and/or the additional passage opening can be generated by a punching method, and/or the lug and/or the further lug and/or the additional lug can be generated by a bending method applied to a punched and/or laser-machined plate portion of the plate element. It is likewise conceivable that the passage opening can be generated by means of laser-machining, eroding, water-jet cutting, a subtractive method, or similar.

The screening element can have four of the passage openings and/or four of the lugs and/or four of the further lugs and/or four of the additional passage openings and/or four of the additional lugs. The passage openings and the additional passage openings can be disposed about the shaft coupling installation, in particular wherein the passage openings can in each case be disposed so as to be adjacent to the additional passage openings. Such a number and a disposal of the passage openings and of the lugs enables effective screening and conveying of grit material in the sanding apparatus.

A sanding device has a screening element which is configured in one of the variants presented, in particular wherein the screening element is disposed on and/or fastened to a shaft installation. Such a sanding device can serve as a replacement for known sanding devices, wherein the sanding device presented here advantageously enables screening and thorough conveying of grit material before the grit material enters an infeed opening of a rotary valve in a sanding apparatus.

A method for generating one of the screening elements presented may include at least the following operations: punching, configuring and/or laser-machining at least one passage opening in a plate element; and disposing at least one lug which from the plate element extends away transversely to a main surface of the plate element, so as to generate the screening element.

In the punching operation, a shaft coupling installation can moreover be punched into the plate element. In the disposing operation, a punched plate portion of the plate element can be bent in order for the lug to be disposed so as to generate the screening element.

A method for operating one of the screening elements presented here may include at least the following operations: moving the screening element so as to obtain grit material; and conveying the screened grit material by means of the moving screening element.

In the description hereunder of exemplary embodiments, the same or similar reference signs are used for the elements and functionally equivalent elements illustrated in the various figures, wherein a repetition of the description of the elements is dispensed with.

If an exemplary embodiment comprises an "and/or" conjunction between a first feature and a second feature, this can be read as meaning that, according to one embodiment, the exemplary embodiment comprises both the first feature and the second feature and, according to a further embodiment, the exemplary embodiment comprises either only the first feature or only the second feature.

FIG. 1 shows a schematic cross-sectional illustration of a sanding apparatus 100 having a sanding device 105 having a screening element 110 for screening and conveying grit material for a vehicle, according to one exemplary embodiment. The sanding apparatus 100 is configured for use with a vehicle, according to this exemplary embodiment for use with a rail vehicle.

According to this exemplary embodiment, the sanding device 105 has the screening element 110 and at least one shaft installation 115 on which the screening element 110 according to this exemplary embodiment is disposed. According to this exemplary embodiment, the screening element 110 is fastened to a shaft sleeve 120 of the shaft installation 115. According to this exemplary embodiment, the sanding device 105 optionally moreover has a rotary valve 122 which is coupled to the shaft installation 115.

The screening element 110 is designed for screening and conveying grit material.

The screening element 110 has a plate element 125 having a shaft coupling installation 130, at least one passage opening, and at least one lug. The passage opening and the lug are illustrated in more detail in FIG. 2. The shaft coupling installation 130 is configured for coupling the screening element 110 to the shaft installation 115 of the rotary valve 122 of the sanding device 105. According to this exemplary embodiment, the shaft coupling installation 130 is configured as a shaft passage opening, the shaft installation 115 being guided therethrough. The passage opening is disposed in the plate element 125 and is configured for passing grit material through the plate element 125. The lug from the plate element 125 extends transversely to a main surface of the plate element 125.

Details of the screening element 110 presented here and of the sanding device 105 are yet again explained in more detail hereunder.

The disclosed embodiments relate to a mechanical sand metering installation in the form of the sanding device 105 having a rotary feeder for a sanding system in the form of the sanding apparatus 100 for vehicles, in particular rail vehicles, so as to increase the friction between the vehicle wheel and the hard ground, in particular the rail.

The screening element 110 presented here advantageously eliminates weak points and deficiencies of known sand metering installations having rotary feeders which, like the sanding apparatus 100 shown here, specifically have a vertical rotation axis, in that the screening element 110 enables screening and conveying of the grit material prior to entering an infeed opening 135 toward the rotary valve 122. Rotary valves 122 with a vertical rotation axis have proven to be less prone to wear and more space-saving in metering installations for rail vehicles than rotary valves 122 with a horizontal axis.

Lump formations of sand caused by moisture, or foreign matter located in a sand hopper 140 of the sanding apparatus 100, can lead to clogging in the infeed opening 135 of the rotary valve housing or in the downstream pneumatic conveying installation 198. Agitator rods or screens attached ahead of the infeed opening are known from known embodiments, wherein the agitator rods are intended to solve the issue of lump formation and to render the sand so as to be more free-flowing, and the screens are intended to keep away foreign matter. In the known embodiments having agitator rods and agitator wings for rendering the sand so as to be more free-flowing and for eliminating any dead volume, a large agitator housing located above the rotary valve housing is required. The screening element 110 presented here as a single component advantageously eliminates both problems and herein can be used in a significantly more space-saving manner. A dedicated filler pipe is also not required thanks to the screening element 110 presented here.

The above issues are solved by an activator plate in the form of the screening element 110 which is located above the rotary valve housing of the rotary valve 122 and of the infeed opening 135 thereof, the activator plate having the at least one passage opening and the one lug. The activator plate by way of the shaft installation 115 is rigidly connected to the rotary valve 122 and rotates conjointly with the latter. While the passage opening serves as a screen for large lumps of sand and foreign matter, the lug in the manner of the shovel has the effect that bulk material or sand is entrained and pushed into the infeed opening.

A description of an exemplary construction of the sanding apparatus 100 shown here, which can also be referred to as a sanding unit, follows hereunder.

The sand metering installation in the form of the sanding device 105 according to this exemplary embodiment is a mechanical metering installation having the rotary valve 122 which rotates about a vertical axis. The rotary valve 122 according to this exemplary embodiment is accommodated in a housing 145 which is configured in multiple parts and is composed of a housing main part 150 and a housing base plate 155. The housing 145 is designed for receiving a cylindrical bush 160, the rotary valve 122 rotatably mounted in the latter, two cover disks 165, 170 which close off the cylindrical bush 160 at the top and the bottom, as well as a gear mechanism 175, and a bell 185 supporting a motor 180.

The cover disks 165, 170 determine the shape of the infeed opening 135 and of an outlet opening 187. The infeed opening 135 in the upper cover disk 165 according to this exemplary embodiment has the shape of a sector of the circle, and in terms of the extent thereof measures 135°, the latter according to this exemplary embodiment corresponding exactly to three chambers of the rotary valve 122. The second half, which in a rotation is the last to sweep the wings of the rotary valve 122, in terms of the diameter thereof is configured so as to be wider. This shape guarantees complete filling of the chambers in the rotary valve 122.

The bell 185 according to this exemplary embodiment is configured in such a manner that the bell 185 has supports for the motor 180 and intervening openings for allowing the sand to flow in. The bell 185 likewise has an anti-rotation safeguard and is screw-fitted to the housing main part 150 and is provided with an annular seal 190 placed on top of the housing main part 150.

During assembling in the rail vehicle, the housing 145 in its entirety is incorporated in a lower opening of the sand hopper 140 in such a manner that the sand hopper 140 has an assembly ring 192 which is attached in the lower opening of the sand hopper 140 and which by way of a main screw fitting by means of six large screws is again screwed to the annular seal 190, the main housing part 150, the lower cover disk 170, and the housing base plate 155. The housing 145 thus protrudes from the sand hopper 140 and represents the outlet opening of the latter. The bell 185, the gear mechanism 175, and the motor 180 are located in the interior of the sand hopper 140. In order to enhance the compatibility with the outlet openings of existing sand hoppers 140, an adapter plate is optionally disposed between the assembly ring 192 and the housing 145 according to this exemplary embodiment.

The motor 180, which according to this exemplary embodiment is an electric motor, is located so as to sit on the bell 185, the gear mechanism 175 being below the motor 180. The torque of the gear mechanism 175 is transmitted to the rotary valve 122 by way of the shaft sleeve 120 in that the shaft sleeve 120 receives axial appendages of the gear mechanism 175 and of the rotary valve 122 and couples the axial appendages to one another by way of a rotational lock.

The shaft sleeve 120 according to this exemplary embodiment offers a hexagonal portion for placing the screening element 110 in a manner secured against rotation. The shaft passage opening of the screening element according to this exemplary embodiment is correspondingly configured as a hexagonal opening (cf. also FIG. 2 to this end). The screening element 110 placed thereon is fixed in relation to sliding from the shaft passage opening by way of a retaining ring. The lug, or at least one additional lug shown in more detail in FIG. 2 which can also be referred to as a shovel, of the screening element 110 according to this exemplary embodiment engages in a chute 194 which is formed by the internal side of the bell 185 on the one hand, and by an elevation of the housing main part 150 on the other hand. The elevation is intended as a protection of a shaft annular seal 196 which lies therebelow and encloses the shaft sleeve 120. A dead volume, similar to that configured in the chute 194 described, is almost inevitable in a construction in which the rotary valve housing lies in an outlet of the sand hopper 140 and feeding of sand into the housing 145 takes place from above.

A pneumatic conveying installation 198 can be fastened to a lower side of the housing base plate 155.

A description of a functional mode of the sanding apparatus 100 follows hereunder:

The grit material, in this case sand, of the sand hopper 140, the walls of the latter running downward in a funnel-shaped manner toward the outlet opening, can flow into the infeed opening 135 of the housing 145 by gravity, or is pushed into the infeed opening 135 by the lugs of the screening element 110 when the sand comes to lie beside the infeed opening 135 on an upper side of the housing 145, respectively. The sand in the uniformly filled chambers of the rotary valve 122 in the housing 145 is conveyed from the infeed opening 135 to the outlet opening 187 by the rotation of the rotary valve 122 caused by the motor 180. The sand in the outlet opening 187 can again flow by gravity toward the nozzle of the conveying installation 198, the latter by way of a conveying line then conveying the metered sand in front of the wheels of the rail vehicle.

Figure 2:
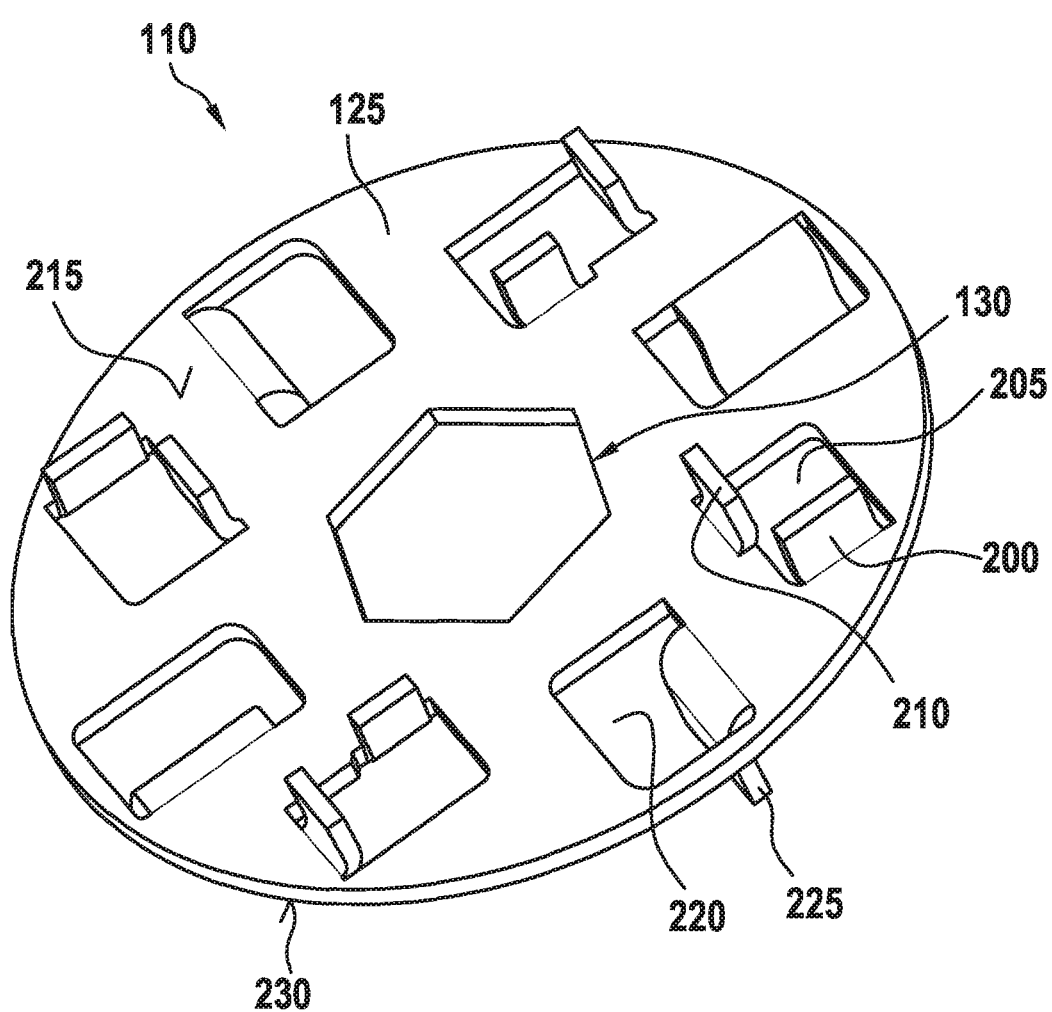
FIG. 2 shows a perspective illustration of the screening element according to one exemplary embodiment.

FIG. 2 shows a perspective illustration of a screening element 110 according to one exemplary embodiment. This herein may be an exemplary embodiment of the screening element 110 described by means of FIG. 1.

The plate element 125 according to this exemplary embodiment is configured as a sheet metal plate and/or designed so as to be circular.

The shaft coupling installation 130 according to this exemplary embodiment is disposed in a center of the plate element 125.

The lug 200 extends from an internal peripheral side of the passage opening 205.

The screening element 110 according to this exemplary embodiment has at least one further lug 210 which from the plate element 110 extends away transversely to the main surface 215. According to this exemplary embodiment the further lug 210 extends from a further internal peripheral side of the passage opening 205 that is disposed transversely to the internal peripheral side.

The screening element 110 according to this exemplary embodiment furthermore has at least one additional passage opening 220 which is disposed in the plate element 125 and/or at least one additional lug 225 which from the plate element 125 extends away transversely to a main surface 230 of the plate element 125 that is opposite the main surface 215. According to this exemplary embodiment, the additional lug 225 extends from an additional internal peripheral side of the additional passage opening 220.

According to an alternative exemplary embodiment, at least one of the lugs 200, 210 extends away from the main surface 215, and/or at least the one additional lug 225 extends away from the opposite main surface 230.

According to this exemplary embodiment, the plate element 125 and at least the lug 200 and/or the further lug 210 and/or the additional lug 225 are configured so as to be integral. According to this exemplary embodiment, at least the passage opening 205 and/or the additional passage opening 220 have/has been generated by a punching method, and/or at least the lug 200 and/or the further lug 210 and/or the additional lug 225 have/has been generated by a bending method applied to a punched or laser-machined plate portion of the plate element 125. An exemplary embodiment in which the screening element is molded from plastics material and/or from a metal die-casting is furthermore conceivable.

According to this exemplary embodiment, the screening element 110 has four of the passage openings 205 and/or four of the lugs 200 and/or four of the further lugs 210 and/or four of the additional passage openings 220 and/or four of the additional lugs 225.

The four passage openings 205 and the four additional passage openings 220 are disposed about the shaft coupling installation 130. The passage openings 205 according to this exemplary embodiment are in each case disposed so as to be adjacent to the additional passage openings 220.

The screening element 110 will be described once more using other words hereunder:

The screening element 110 according to this exemplary embodiment has four openings shaped as elongate circles in the form of the passage openings 205, and four punched clearances in the form of the additional passage openings 220, the additional lugs 225 in the latter being bent so as to form downward pointing shovels. A number, shape and dimension of the openings and punched clearances shown here has proven advantageous during a test phase.

The additional lugs 225 have the effect that grit material such as sand which has come to lie directly on the metering housing described in FIG. 1 and is unable to flow into the infeed opening is entrained and pushed or shoveled into the infeed opening.

While using the screening element 110, advantageously no grit material can accumulate in a construction-related dead volume in the vicinity of the infeed opening toward the rotary feeder.

The additional lugs 225 which can also be referred to as "downward lugs" serve for conveying the sand below the sheet metal plate onward into the inlet and, on account thereof, to facilitate the ongoing flow of sand. It is furthermore prevented by the additional lugs 225 that the sand solidifies below the sheet metal plate. A shape of the additional lugs 225 and an orientation, i.e. an angle in relation to the center point, may vary.

According to this embodiment, a transmission of torque is enabled by way of a hexagon. According to an alternative exemplary embodiment, the shaft coupling installation 130 is configured for enabling the transmission of torque by way of a polygon, a feather key and/or a toothing. The shaft coupling installation 130 is designed to be able to be welded and/or adhesively bonded and/or jammed and/or press-fitted to the shaft installation.

The lugs 200 and/or the further lugs 210, which can also be referred to as "upwardly directed lugs", in particular in the case of wet sand, in particular with up to 0.5% moisture by volume, ensure that the sand structure is broken down and loosened. According to an alternative exemplary embodiment, the lugs 200 and/or the further lugs 210 are not configured so as to be integral to the plate element 125 but are welded and/or screw-fitted and/or riveted to the latter, and/or are embodied as bolts. According to an alternative exemplary embodiment, the lug 200 and/or the further lugs 210 are not embodied so as to be rectangular, as shown here, but so as to be semi-circular or triangular, or in any other useful shape. An angle of the lugs 200 and/or the further lugs 210 is inclined in relation to the center point so as to be able to shovel sand in one direction.

The throughflow openings 205 and/or the additional throughflow openings 220 serve for allowing the sand to flow below the screening element 110 into a region of the inlet toward the rotary valve. According to this exemplary embodiment, at least one of the openings 205, 220 has a minimum size of approx. 10 times a mean grain size of the grit material. In the dimensioning attention is likewise paid to sufficient throughflow being provided in order for the cells to be able to be pre-filled at the maximum velocity. The openings 205, 220 are likewise sufficiently small so as to retain foreign matter.

A screening function of the screening element 110 advantageously keeps comparatively large particles such as rocks, chewing gum, lumps of grease, or the like away from the rotary valve, or from the downstream conveyor unit.

Potential malfunctions in the use of the vehicle were simulated in a test environment using a sanding apparatus having mechanical sand metering by means of a rotary valve as is described in FIG. 1, and having the screen element 110 shown here installed. Rocks, plastic film remnants, broom hairs, and chewing gum were disposed herein as foreign matter in the sand hopper which can also be referred to as a sand box. Moreover, sand with a moisture content of 0.5% was used.

The sanding apparatus did not display any defects or impediments when incorporating the foreign matter into the quantity of sand. The mean values of the measured data are almost identical to the mean values of the reference measurement. No damage whatsoever was able to be established in any of the foreign matter upon concluding the tests. In terms of the error type rocks and broom hairs, no remnants of the foreign matter were found in the sanding apparatus after the measuring. In terms of the error type chewing gum, the specimens were found in the screening element 110 after the measurement. In terms of the error type plastic film remnants, one out of three film pieces was able to be found in the screen element 110 after the measurement. The sand hopper 140 was able to be completely emptied without a defect.

Figure 3:
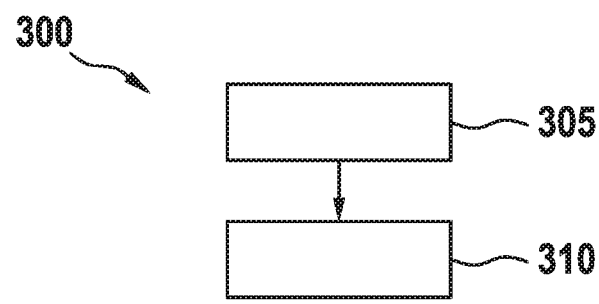
FIG. 3 shows a flow diagram of a method for generating a screening element according to one exemplary embodiment.

FIG. 3 shows a flow diagram of a method 300 for generating a screening element according to one exemplary embodiment. This herein may be a method 300 for generating one of the screening elements described in FIG. 1 or 2.

The method 300 comprises an operation 305 of punching, configuring and/or laser-machining, and a step 310 of disposing. In operation 305 of punching, configuring and/or laser-machining, at least one passage opening is punched/laser-machined into a plate element. In operation 310 of disposing, at least one lug, which from the plate element extends away transversely to a main surface of the plate element, is disposed, so as to generate the screening element.

In operation 305 of punching, configuring and/or laser-machining, a shaft coupling installation is moreover optionally punched into the plate element according to this exemplary embodiment. In operation 310 of disposing, a punched plate portion of the plate element is optionally bent according to this exemplary embodiment in order for the lug to be disposed so as to generate the screening element.

The method operations presented here can be repeated and be carried out in a sequence which differs from the sequence described here.

Figure 4:
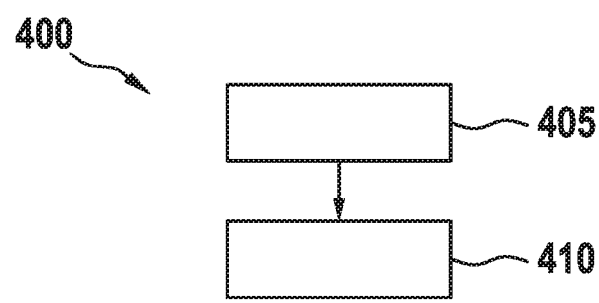
FIG. 4 shows a flow diagram of a method for operating a screening element according to one exemplary embodiment.

FIG. 4 shows a flow diagram of a method 400 for operating a screening element according to one exemplary embodiment. This herein may be a method 400 for operating one of the screening elements described in FIG. 1 or 2.

The method 400 comprises an operation 405 of moving and an operation 410 of conveying. In operation 405 of moving, the screening element is moved so as to obtain screened grit material. In operation 410 of conveying, the screened grit material is conveyed by means of the moving screening element.

The method operations presented here can be repeated and be carried out in a sequence which differs from the sequence described here.

LIST OF REFERENCE SIGNS

100 Sanding apparatus
105 Sanding device
110 Screening element
115 Shaft installation
120 Shaft sleeve
122 Rotary valve
125 Plate element
130 Shaft coupling installation
135 Infeed opening
140 Sand hopper
145 Housing
150 Housing main part
155 Housing base plate
160 Bush
165 Upper cover disk
170 Lower cover disk
175 Gear mechanism
180 Motor
185 Bell
187 Outlet opening
190 Annular seal
192 Assembly ring
194 Chute
196 Shaft annular seal
198 Pneumatic conveying installation
200 Lug
205 Passage opening
210 Further lug
215 Main surface
220 Additional passage opening
225 Additional lug
230 Opposite main surface
300 Method for generating a screening element
305 Operation of punching, forming, and/or laser machining
310 Operation of disposing
400 Method for operating a screening element
405 Operation of moving
410 Operation of conveying

The invention claimed is:

1. A screening element for screening and conveying grit material for receipt by a sanding device of a sanding apparatus for a vehicle, wherein the screening element comprises:
   a plate element having a shaft coupling installation for coupling the screening element to a shaft installation of a rotary valve of the sanding device;
   at least one passage opening which for passing grit material through the screening element is disposed in the plate element; and
   at least one lug which from the plate element extends away transversely to a main surface of the plate element.

2. The screening element of claim 1, wherein the plate element is configured as a sheet metal plate.

3. The screening element of claim 1, wherein the plate element is circular.

4. The screening element of claim 1, wherein the shaft coupling installation is disposed in a center of the plate element, and wherein the shaft coupling installation is configured as a shaft passage opening for guiding therethrough the shaft installation.

5. The screening element of claim 1, wherein the lug extends from an internal peripheral side of the passage opening.

6. The screening element of claim 1, having a further lug which from the plate element extends away transversely to the main surface, wherein the further lug extends from a further internal peripheral side of the passage opening that is disposed transversely to the internal peripheral side.

7. The screening element of claim 1, having at least one additional passage opening which is disposed in the plate element, and/or at least one additional lug which from the plate element extends away transversely to a main surface of the plate element that is opposite the main surface.

8. The screening element of claim 1, wherein the plate element and the lug and/or the further lug and/or the additional lug are integral, wherein the passage opening and/or the additional passage opening have/has been generated by a punching method, and/or the lug and/or the further lug and/or the additional lug have/has been generated by a bending method applied to a punched and/or laser-machined plate portion of the plate element.

9. The screening element of claim 1, having four of the passage openings and/or four of the lugs and/or four of the further lugs and/or four of the additional passage openings and/or four of the additional lugs.

10. The screening element of claim 9, wherein the passage openings and the additional passage openings are disposed about the shaft coupling installation, in particular wherein the passage openings are in each case disposed so as to be adjacent to the additional passage openings.

11. A sanding device having a screening element of claim 1, wherein the screening element is disposed on and/or fastened to a shaft installation.

12. A method for generating a screening element for screening and conveying grit material for receipt by a sanding device of a sanding apparatus of a vehicle, wherein the screening element includes a plate element having a shaft coupling installation for coupling the screening element to a shaft installation of a rotary valve of the sanding device, at least one passage opening which for passing grit material through the screening element is disposed in the plate element, and at least one lug which from the plate element extends away transversely to a main surface of the plate element, and wherein the method comprises:
punching, configuring and/or laser-machining at least one passage opening in a plate element, and
disposing at least one lug which from the plate element extends away transversely to a main surface of the plate element, so as to generate the screening element.

13. A method for generating a screening element for screening and conveying grit material for receipt by a sanding device of a sanding apparatus of a vehicle, wherein the screening element includes a plate element having a shaft coupling installation for coupling the screening element to a shaft installation of a rotary valve of the sanding device, at least one passage opening which for passing grit material through the screening element is disposed in the plate element, and at least one lug which from the plate element extends away transversely to a main surface of the plate element, and wherein the method comprises:
moving the screening element to obtain screened grit material, and
conveying the screened grit material by the moving screening element.

14. The method of claim 12, the screening element having a further lug which from the plate element extends away transversely to the main surface, wherein the further lug extends from a further internal peripheral side of the passage opening that is disposed transversely to the internal peripheral side.

15. The method of claim 13, the screening element having a further lug which from the plate element extends away transversely to the main surface, wherein the further lug extends from a further internal peripheral side of the passage opening that is disposed transversely to the internal peripheral side.

16. The method of claim 12, the screening element having at least one additional passage opening which is disposed in the plate element, and/or at least one additional lug which from the plate element extends away transversely to a main surface of the plate element that is opposite the main surface.

17. The method of claim 13, the screening element having at least one additional passage opening which is disposed in the plate element, and/or at least one additional lug which from the plate element extends away transversely to a main surface of the plate element that is opposite the main surface.

* * * * *